US006716933B2

(12) United States Patent
Alewelt et al.

(10) Patent No.: US 6,716,933 B2
(45) Date of Patent: Apr. 6, 2004

(54) WORKING UP OF POLYMER SYNTHESIS SOLUTIONS

(75) Inventors: Wolfgang Alewelt, Krefeld (DE); Wolfgang Ebert, Krefeld (DE); Thomas Fritz, Krefeld (DE); Dirk Jahn, Stefan (DE); Stefan Westernacher, Kempen (DE); Frank Bruynseels, Sint Gillis Waas (BE); Johann Rechner, Kempen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/196,022

(22) Filed: Jul. 16, 2002

(65) Prior Publication Data

US 2003/0023030 A1 Jan. 30, 2003

(30) Foreign Application Priority Data

Jul. 19, 2001 (DE) .......................................... 101 35 314

(51) Int. Cl.$^7$ ............................................... C08G 64/00
(52) U.S. Cl. .................... 525/461; 264/176.1; 264/219; 524/599; 524/611
(58) Field of Search ............................. 264/176.1, 219; 524/599, 611; 525/461

(56) References Cited

U.S. PATENT DOCUMENTS

| 2,451,768 | A | | 10/1948 | Nichols ........................ 18/57 |
| 3,108,994 | A | | 10/1963 | Zelinski et al. ............. 260/93.5 |
| 3,227,702 | A | | 1/1966 | Small et al. ................ 260/94.9 |
| 3,297,667 | A | | 1/1967 | Dohlen et al. ............. 260/82.1 |
| 4,338,429 | A | * | 7/1982 | Serini et al. ................ 528/196 |

* cited by examiner

*Primary Examiner*—Terressa Boykin
(74) *Attorney, Agent, or Firm*—Joseph C. Gil; James R. Franks; Aron Preis

(57) ABSTRACT

The present invention relates to a process for working up solutions of polymers in organic solvents contaminated by alkaline constituents, using homogeneously soluble acids, especially by the introduction of an acid gas, and subsequent washing, and to the polymers so obtainable, which are distinguished by the fact that, on treatment with moist heat (sterilisation), only few defects caused by decomposition are formed, to the use thereof in the production of extrudates and molded specimen, and to the extrudates and molded specimen produced from those polymers themselves.

11 Claims, No Drawings

WORKING UP OF POLYMER SYNTHESIS SOLUTIONS

FIELD OF THE INVENTION

The invention is directed to a process for working up organic solutions of polymers and more particularly to working up organic solutions contaminated by alkaline constituents.

BACKGROUND OF THE INVENTION

Polycarbonate, as an example of a polymer to be washed according to the invention, is produced in by far the majority of cases by the known interfacial process, which is described by way of example in the following publications Schnell, "Chemistry and Physics of Polycarbonates", Polymer Reviews, Volume 9, Interscience Publishers, New York, London, Sydney 1964, p. 33 ff;

D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18 (1980), p. 75 ff;

D. Freitag, U. Grigo, P. R. Müller, N. Nouvertne', BAYER AG, "Polycarbonates" in Encyclopedia of Polymer Science and Engineering, Volume 11, Second Edition, 1988, p. 651 ff, and finally Dres. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, p. 118 ff and 138 ff and also in EP-A 0 359 953 and many other patents.

These publications relate to the synthesis of polycarbonate by the so-called "interfacial process", which takes place in a two-phase reaction mixture consisting of inorganic phase (water, alkali) and an organic phase (organic solvents, insoluble in water, mostly chlorinated hydrocarbons such as dichloromethane and/or chlorobenzene).

The product of that synthesis is an organic phase (herein after also called organic synthesis solution), which contains the polycarbonate in dissolved form, and an inorganic aqueous alkaline phase, which contains the salts formed in the synthesis, such as NaCl, sodium hydrogen carbonate, soda, additionally residues of the phenolates, bisphenolates and sodium hydroxide used, as well as catalysts and secondary products thereof, as well as water-soluble compounds originating as impurities from the starting materials or formed as by-product. If a different basic compound is used instead of NaOH, the aqueous alkaline phase contains the corresponding analogous salts or secondary products.

The aim of the working-up which follows is to separate off that inorganic aqueous phase as completely as possible and to remove the remaining, especially alkaline residues of the inorganic compounds, which are contained in the soluble and dispersed water content of the separated organic phase, as completely as possible from the organic phase. That is achieved by washing operations, which are optionally combined with acidification steps. Such purification operations are, if possible, carried out before concentration of the organic phase if heat processes are used for the purpose of concentration.

Similar problems are also known in the case of other polymers. Polymers whose synthesis solution can be acidified by the process according to the invention are, therefore, all polymers whose synthesis yields alkaline solutions or suspensions or emulsions. There may be mentioned by way of non-limiting examples polysulfones, polyether sulfones, polyphenylene oxides, or their suspensions, styrene copolymers, such as ABS, provided they are prepared in suspension, polycarbonates, polyester carbonates, polyether carbonates and polyethers.

Purification of the synthesis solution is achieved by washing that organic solution with water one or more times. That is generally carried out with the aid of one or more acidifications and washing with water, mostly in several steps.

The acidification includes either the entire alkaline potential of the synthesis or, preferably, after separation of the phases in the alkaline pH range, only the neutralization of residual constituents of the aqueous phase dissolved or, in admixture with residues of the aqueous phase, dispersed in the organic phase. There are used for such acidifications aqueous mineral acids, especially hydrochloric acid and phosphoric acid, or alternatively aqueous solutions of organic acids.

That washing and acidification is likewise the subject-matter of many patents and publications.

For example, EP-A 0 023 570 describes a process for working up the alkaline synthesis solution using separators that produce shear energy, optionally with the use of dispersing agents.

DETAILED DESCRIPTION OF THE INVENTION

It has now been found that, as the demands made of the polymer increase, the conventional methods of working up are no longer sufficient. Even the smallest traces of inorganic residues, especially alkali and catalyst residues, from the synthesis cause significant damage in the case of applications in which the polymer is exposed to high temperatures, optionally combined with moisture. Such damage may be micro-scratches, instability of the melt viscosity or, in extreme cases, the formation of white spots of hydrolyzed polymer. All such damage is known to the person skilled in the art.

In general, attempts are made to counter that phenomenon by means of suitable additives. However, the use of stabilizers as additives is limited by the loss of mechanical properties or, for example, by an adverse effect on the hydrolytic behavior of the stabilized polymer. The use of, for instance polycarbonate in the medical or food-related applications is therefore very limited for regulatory reasons.

Separation of the inorganic constituents, whether they be salt, salt of the catalyst or alkali from the synthesis of the polymer or water from the washing of the polymer synthesis solution, is also expedient because separation (salt, alkali) is no longer possible in the following working-up and compounding steps. In the case of the washing water, significant damage can be caused, for example, even by concentration of the polymer solution used to obtain the polymer out of the solution, where such concentration involves thermal steps such as distillations or flash steps, because the methylene chloride frequently used as solvent is susceptible to decomposition. The person skilled in the art is also familiar with such reactions.

Starting from those problems, the object is, therefore, to find a working-up process that leads to a significant reduction in the inorganic constituents, especially the alkaline constituents in the parts per billion (ppb) range in the organic polymer solution, before the polycarbonate solution is concentrated further in order to separate off the polymer.

Surprisingly, this object is achieved by a process for working up polymer synthesis solutions, which are obtained by an interfacial condensation process for manufacturing of polymers, in which the organic polymer-containing phase is separated off and acidified with acids that are homogeneously soluble in the organic phase—such as hydrogen halides, organic carboxylic and/or sulfonic acids having from 1 to 22 carbon atoms, which may optionally be branched or substituted, or their derivatives, such as, for example, halides or anhydrides, mineral acids, acid chlorides of mineral acids, especially such acids that have better solubility in water than in organic solvents or that react with water to form such components; preferably HCl gas, $SO_2$, ortho/meta/poly-phosphoric acids and organic carboxylic and/or sulfonic acids having from 1 to 12 carbon atoms, which may optionally be branched or substituted; very particularly preferably HCl gas and phosphoric acid—and is then optionally washed with water as usual.

Within the context "homogeneous acidification" is understood as meaning acid compound in pure form or in solution in organic solvent added to organic phase, which contains the polymer, and dissolve homogeneously in the polymer solution.

That acidification step according to the invention be carried out instead of the usual washing of the polymer-containing solution with aqueous mineral acids or alternatively, in a preferred embodiment of the process according to the invention, it be inserted as an additional step to complete the acidification after separation of the aqueous acid washing phase or after one of the subsequent washing steps. The process step according to the invention, of course, also be carried out repeatedly. The acid that is soluble in the organic phase is added without a solvent, preferably in the form of a gas, or in the form of a solution in an inert solvent, preferably that of the polymer solution. Homogeneous mixing into the polymer-containing phase is carried out by means of turbulent mixing, static mixers or dynamic mixers.

The process according to the invention is preferably applied to polycarbonate solutions.

Acids such as may be used in the process according to the invention are, for example, without limiting the subject-matter of the present Application thereto: $C_1$–$C_{22}$, optionally branched or substituted carboxylic or sulfonic acids, especially formic acid, methane-, ethane- iso- or n-propane-, iso-, n- or neo-butane-, iso- or n-pentane-, n- or iso-hexane-, phenyl-, toluene-, xylene-carboxylic and/or -sulfonic acids, which may optionally be branched and/or substituted, especially by O-alkyl, —O-aryl, —CO—, F, Cl, Br or heterocycles. The derivatives of those acids which yield the acids in aqueous solution, such as acid halides, especially the acid chlorides or acid anhydrides, are also suitable. Also suitable are dicarboxylic or disulfonic acids having from 1 to 22 carbon atoms, such as oxalic acid, malonic acid, succinic acid, adipic acid, citric acid, malic acid, tartaric acid, isophthalic acid, terephthalic acid or orthophthalic acid, etc., as well as their derivatives described correspondingly under the carboxylic acids. Ketocarboxylic acids, such as, for example, pyruvic acid, are also suitable for use according to the invention.

As mineral acids or acid gases there may be used HCl, HBr, $H_2SO_4$, $H_2SO_3$, $SO_2$, $H_3PO_4$, $H_3PO_3$ (phosphorous acid/phosphonic acid), metaphosphoric acid, polyphosphoric acid and mixtures thereof, preferably HCl, $SO_2$ and phosphoric acid.

As derivatives of the acids there may be used, for example, anhydrides and acid chlorides, such as $SO_2$, $P_2O_5$, $P_2O_3$, $SOCl_2$, $SO_2Cl_2$, $POCl_3$ or the anhydrides or mixed anhydrides of organic acids, preferably $SO_2$.

Ideally, and hence preferably, the acids used are readily soluble, particularly preferably very readily soluble, in water, or the acid derivatives used react with water to form such readily or very readily water-soluble acids. Washing of the excess acid from the organic phase is thus substantially simplified.

The acids to be used according to the invention are added without a solvent, preferably in gas form, or in the form of a solution. The solutions are then prepared in organic solvents that are soluble in the solvents used in the synthesis, preferably in dichloromethane or chlorobenzene or mixtures thereof. It may be advantageous to use the solvents in the undried state, because the solubility of the acid compound in the solvent may be improved by dissolved residual moisture.

The introduction of the acid according to the invention may take place at any point in the polymer synthesis solution washing procedure. However, it may also take place before the washing and before an acidification with aqueous acids according to the prior art. Or preferably after the acidification with aqueous acids, optionally repeatedly, optionally also after a partial washing step. The acidification step according to the invention may also be carried out after or before each washing stage or after intermediate storage of a synthesis solution washed according to the prior art, or immediately before a concentration step or isolation step of the polymer in or from the organic solution.

In the case of an additive step, that is to say the homogeneous acidification according to the invention is inserted in addition to a conventional heterogeneous washing at any desired point of the working up, even as the final step without further washing, the acid used for the homogeneous acidification must not be the same as that used in the aqueous phase.

The process of acidification according to the invention may also be used as the only acidification step in the washing process. Such a process is optionally carried out using washing water added in parallel with or upstream or downstream of the acid, the acid solution, the gas or the gas solution.

If a washing operation with separators is used, the process according to the invention may also be inserted before and after each separator. The same applies to the individual steps of a pendulum-type washing operation such as may be carried out, for example, in stirrer vessels.

The process according to the invention may also be carried out between or in so-called coalescers instead of separators.

Acidification steps according to the invention may, of course, likewise be carried out upstream or downstream of wash lines of mixed operation, that is to say which use combinations of different conventional washing processes.

Acidification is homogeneous acidification, that is to say acidification according to the invention, i.e. the supply of acid gases or of acids dissolved homogeneously in the organic solvent. The feeding in of the acidifying agents according to the invention may take place in special vessels, in pipes or alternatively in the described devices corresponding to the prior art, such as separators or coalescers with and without a mixing unit. Thorough mixing of the organic polymer-containing phase with the organic acid-containing phase may be carried out by means of flow, turbulence, static mixers or dynamic mixers (stirrers, Ultrathurax, etc.).

An exception is the use of volatile or decomposable acidifying agents dissolved homogeneously in the organic phase, such as HCl gas, oxalic acid, pyruvic acid, etc., where the washing out of excesses may optionally be dispensed with if removal or decomposition is ensured by the subsequent concentration steps.

Of course, the process according to the invention is suitable generally also for the working up of solutions of polymers in organic solvents contaminated with alkaline impurities. Accordingly, the present invention relates also to such an application.

The present Application relates also to the low-fault stable polymers obtainable by the purification process according to the invention.

The defects are determined as follows:

Color sample specimens are produced from the granules of the polymer, for example polycarbonate, worked up according to the invention. The specimens (dimensions 40×60×4 mm) are produced by means of an injection-molding machine—e.g. an Arburg 370-G having a locking pressure of 50–85 t, 3-zone screw, screw forward speed 40 mm/s—at a material temperature of 300° C. and a tool temperature of 90° C.

The specimens, which have no defects, are then sterilized for 18 hours at 126° C. and 1.4 bar with superheated steam, for example in a Vacuclav 31 device from Melag. The color sample specimens then exhibit more or less white spots. An 11.5×16 mm section is recorded at 8×magnification by means of a stereomicroscope, e.g. Leica "Wild M10", and evaluated, for example, by means of the program "analySIS" from SIS. All defects (=white spots) having a diameter (Ø) larger than 0.2 mm (large defects) and Ø from 0.05 to 0.2 mm (small defects) are counted. Polymers classified as low-fault according to the invention, to which the present Application relates, contain fewer than 10 defects in such an image section.

Polycarbonates such as may be worked up in the process according to the invention are those based on suitable diphenols, that is to say, for example, hydroquinone, resorcinol, dihydroxydiphenyl, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl)-sulfones, bis-(hydroxyphenyl) sulfoxides, α,α'-bis-(hydroxyphenyl)-diisopropylbenzenes, which diphenols may optioally be alkylated or halogenated at the nucleus.

Preferred diphenols are hydroquinone, resorcinol, 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxyphenyl)propane, 2,4-bis-(4-hydroxyphenyl)-2-methylbutane, 1,1'-bis-(4-hydroxyphenyl)-m- or -p-diisopropylbenzene, 2,2-bis-(3-methyl-4-hydroxy-phenyl)-propane, bis-(3,5-dimethyl-4hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2methylbutane, 1,1'-bis-(3,5-dimethyl-4hydroxyphenyl)-m- or -p-diisopropylbenzene and 1,1-bis-(4-hydroxyphenyl)-3,3,5-trimethylcyclohexane.

Particularly preferred diphenols are resorcinol, 4,4'-dihydroxydiphenyl, 1,1-bis-(4-hydroxyphenyl)-phenyl-ethane, 2,2-bis-(4-hydroxyphenyl)-propane, 2,2-bis-(3,5-dimethyl-4-hydroxyphenyl)-propane, 1,1'-bis-(3,5-dimethyl-4-hydroxyphenyl)-m- or -p-diisopropylbenzene, 1,1-bis-(4-hydroxyphenyl)-cyclohexane and 1,1-bis-(4-hydroxyphenyl)-3,3,5-trimethylcyclohexane.

Those and other suitable diphenols are described, for example, in U.S. Pat. Nos. 3,028,635, 2,999,835, 3,148,172, 2,991,273, 3,271,367, 4,982,014 and 2,999,846, in DE-A 1 570 703, 2 063 050, 2 036 052, 2 211 956 and 3 832 396, French Patent Specification 1 561 518, in the monograph "H. Schnell, Chemistry and Physics of Polycarbonates, Interscience Publishers, New York 1964", p. 77 ff and in JP-A 62039/1986, 62040/1986 and 105550/1986.

In the case of homopolycarbonates, only one diphenol is used, and in the case of copolycarbonates a plurality of diphenols is used, it being possible, of course, for the bisphenols used, like all the other chemicals and auxiliary substances added to the synthesis, to be contaminated with the impurities from their own synthesis, although it is desirable to use raw materials that are as clean as possible.

As carbonate precursor there are used halogen derivatives of carbonic acid, such as are described in the cited literature, especially phosgene, it being possible for the preparation of polyester carbonates optionally to replace a portion, from 0 to 90 mol %, preferably from 25 to 75 mol % (based on moles of bisphenols), of the phosgene by acid halides, especially acid chlorides, of organic dicarboxylic acids, especially of aromatic dicarboxylic acids or mixtures of organic dicarboxylic acid dichlorides. A special form is the use of organic dicarboxylic acids or mixtures thereof and their reaction with phosgene in situ to form the corresponding dicarboxylic acid dichlorides, the reaction being carried out at suitable, temporarily often also acid, pH values and generally ending in the markedly alkaline pH range.

Catalysts are ammonium and/or phosphonium compounds or tertiary amines such as are described in the literature, especially N-ethylpiperidine, N-methylpiperidine, triethylamine and tributylamine, or mixtures thereof, it being possible for such catalysts to be added in one metered amount or alternatively by the metering in of several amounts at intervals in time (batch process) or in space (continuous process).

Suitable alkaline components include any alkali and alkaline earth hydroxides that are soluble or dispersible in water, but preferably sodium hydroxide, potassium hydroxide, magnesium hydroxide and/or calcium hydroxide (suspension of calcium hydroxide in water) or mixtures thereof.

The solids content of the polymer solution to be washed may vary according to the molecular weight of the polymer from 0.5 wt. % to 30 wt. % polymer; at molecular weights (weight average "Mw") from 8000 to 50,000, preference is given to polymer solids contents of from 2 wt. % to 25 wt. % polymer, preferably from 5 wt. % to 22 wt. % polymer, particularly preferably 7 wt. % to 20 wt. %, and at molecular weights (Mw)>50,000, preference is given to polymer solids contents of from 2 wt. % to 15 wt. % polymer.

The molecular weight (weight average Mw) is determined by means of gel permeation chromatography (GPC) with methylene chloride as eluant. Detection is by means of UV or refractive index (RI). Columns based on polystyrene gels, calibrated against polycarbonate, are used. In the present case, a HP 1050 was used.

The organic solvents for the polycarbonate solution to be washed are those which are solvents for the polycarbonate in question and yield a two-phase synthesis mixture with water, such as aliphatic, optionally branched, partially halogenated or perhalogenated solvents having from 1 to 10 carbon atoms, with chlorine or fluorine being used as the halogen, such as methylene chloride, trichloroethane, tetrachloroethene, also optionally substituted aromatic compounds having from 6 to 18 carbon atoms, such as benzene, toluene, o-, m- and/or p-xylene, methoxy- or ethoxybenzene, diphenyl, diphenyl ether, chlorobenzene, o-, m- and/or p-dichlorobenzene, as well as mixtures of such solvents. Preferred solvents are methylene chloride and chlorobenzene, especially chlorobenzene.

Suitable chain terminators are both monophenols and monocarboxylic acids. Suitable monophenols are phenol, alkylphenols such as cresols, p-tert-butylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, and mixtures thereof.

Suitable monocarboxylic acids are benzoic acid, alkylbenzoic acids and halobenzoic acids.

The amount of chain terminators to be used is from 0.5 mol % to 10 mol %, based on moles of diphenols used in a particular case. The addition of the chain terminators may take place before, during or after the phosgenation.

Suitable branching agents are the tri- or poly-functional compounds known in polycarbonate chemistry, especially those having three or more phenolic OH groups.

Suitable branching agents include phloroglucinol, 4,6-dimethyl-2,4,6-tri-(4-hydroxyphenyl)-heptane, 2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl)-isopropyl)-phenol, 2,6-bis-(2-hydroxy-5'-methyl-benzyl)-4-methylphenol, 2-(4-hydroxyphenyl)-2-(2, 4-dihydroxyphenyl)-propane, hexa-(4-(4-hydroxyphenyl-isopropyl)phenyl)-orthoterephthalic acid ester, tetra-(4-hydroxyphenyl)-methane, tetra-(4-(4-hydroxyphenyl-isopropyl)-phenoxy)-methane and 1,4-bis-(4',4"-dihydroxy-triphenyl)-methyl)-benzene, as well as 2,4-dihydroxybenzoic acid, trimesic acid, cyanuric chloride and 3,3-bis-(3-methyl-4-hydroxyphenyl)-2-oxo-2,3-dihydroindole or a mixture thereof.

The amount of branching agents that are optionally to be used is from 0.05 mol % to 2.5 mol %, preferably from 0.1 to 1.0 mol %, again based on moles of diphenols used in a particular case.

The branching agents may either be used initially with the diphenols and the chain terminators in the aqueous alkaline phase, or they may be added in solution in an organic solvent before the phosgenation.

All those measures for the preparation of the polycarbonates are known to the person skilled in the art.

Aromatic dicarboxylic acids suitable for the preparation of the polyester carbonates are, for example, phthalic acid, terephthalic acid, isophthalic acid, tert-butyl-isophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenylsulfonedicarboxylic acid, 2,2-bis-(4-carboxyphenyl)-propane, trimethyl-3-phenylindane-4,5'-dicarboxylic acid, branched and unbranched aliphatic $C_6$–$C_{34}$-dicarboxylic acids.

Of the aromatic dicarboxylic acids, particular preference is given to the use of terephthalic acid and/or isophthalic acid.

Of the aliphatic dicarboxylic acids, particular preference is given to the use of undecanoic acids and dimer fatty acids.

Derivatives of dicarboxylic acids are the dicarboxylic acid dihalides, especially dicarboxylic acid dichlorides.

Embodiments that satisfy the definitions and parameters mentioned under preferred, particularly preferred or very particularly preferred are preferred, particularly preferred or very particularly preferred.

However, the above-mentioned definitions or explanations and parameters mentioned generally or in preferred ranges may be combined with one another, that is to say between the respective ranges and preferred ranges, as desired. They apply correspondingly to the end products as well as to the preliminary products and intermediate products and processes.

The replacement of the carbonate groups by the aromatic dicarboxylic acid ester groups takes place substantially stoichiometrically and also quantitatively, so that the molar ratio of the reactants is also found in the finished polyester carbonate. The incorporation of the aromatic dicarboxylic acid ester groups may take place both randomly and block-wise.

The preferred method of preparing the polycarbonates to be used according to the invention, including the polyester carbonates, is the known interfacial process.

The molecular weights (Mw) of the polymers, especially polycarbonates, according to the invention are from 12,000 to 50,000, preferably from 15,000 to 40,000. The molecular weights are determined by the GPC process already described above.

The present Application relates also to the polycarbonates such as are prepared by the process according to the invention, and to their use in the production of extrudates and molded articles, especially extrudates and molded articles for use in the transparent field, very particularly in the field of optical applications, such as, for example, articles, multi-wall articles, glazing, headlight lenses, lamp covers, or optical data storage means, such as audio CD's, DVD's, minidiscs in their various read-only or recordable, optionally also rewritable, forms.

The present Application also provides the extrudates and molded articles produced from the low-fault polymers according to the invention.

Further applications, without limiting the subject-matter of the present invention, are, for example:

1. Safety panes, which, as is known, are required in many areas of buildings, vehicles and aircraft, as well as the visors of helmets.
2. Production of films, especially ski films.
3. Production of blow-molded articles(see, for example, U.S. Pat. No. 2,964,794), for example 1 to 5 gallon water bottles.
4. Production of transparent articles, especially of hollow-chamber s, for example for covering buildings such as railway stations, greenhouses and lighting installations.
5. Production of optical data storage means (for example CD, CD-R(W), DVD, DVD-R(W), etc).
6. For the production of traffic light housings or road signs.
7. For the production of foamed materials (see, for example, DE-AS 1 031 507).
8. For the production of threads and wires (see, for example, DE-AS 1 137 167 and DE-A 1 785 137).
9. As translucent plastics having a content of glass fibres for lighting purposes (see, for example, DE-OS 1 554 020).
10. As translucent plastics having a content of barium sulfate, titanium dioxide and or zirconium oxide or organic polymeric acrylate rubbers (EP-A 634 445, EP-A 269 324) for the production of transparent and light-scattering moldings.

11. For the production of precision injection-molded parts, such as, for example, lens holders. To that end, polycarbonates having a content of glass fibres are used, which optionally contain in addition approximately from 1 to 10 wt. % $MOS_2$, based on the total weight.
12. For the production of parts for optical devices, especially lenses for photographic and film cameras (see, for example, DE-OS 2 701 173).
13. As light transmission carriers, especially as fibre-optic cables (see, for example, EP-A1 0 089 801).
14. As electrical insulating materials for electrical conductors and for plug housings as well as plug connectors.
15. Production of mobile phone casings having improved resistance to perfume, aftershave and perspiration.
16. Network interface devices.
17. As carrier material for organic photoconductors.
18. For the production of lamps, for example in the form of headlamps, headlight lenses or internal lenses.
19. For medical applications, for example oxygenators, dialysers.
20. For foodstuffs applications, such as, for example, bottles, kitchenware and chocolate molds.
21. For applications in the automotive sector as automotive glazing, or where contact with fuels and lubricants may occur, such as, for example, bumpers, optionally in the form of suitable blends with ABS or suitable rubbers.
22. For sports articles, such as, for example, slalom poles or ski boot buckles.
23. For domestic articles, such as, for example, kitchen sinks and letter box casings.
24. For casings, such as, for example, electrical distribution cabinets.
25. Casings for electric toothbrushes and hairdryer casings.
26. Transparent washing machines—bull's-eyes having improved resistance to the washing solution.
27. Safety goggles, optical corrective spectacles.
28. Lamp covers for kitchen appliances having improved resistance to cooking steam, especially oil vapours.
29. Packaging films for medicaments.
30. Chip boxes and chip carriers.
31. For other applications, such as, for example, stable doors or animal cages.

The Examples which follow are intended to illustrate the subject-matter of the present invention, but without limiting it.

EXAMPLES

Parallel test according to the invention and comparative example:

The starting solution used for the test was 40 l of a 15 wt. % polycarbonate solution in a 1:1 mixture of methylene chloride and chlorobenzene, which had already been acidified and washed twice with water in a separator.

The following test sequence was chosen, the same machines and apparatuses being used for both routes. The route, representing the invention, differs from the comparative route only in the critical step of adding HCl as the homogeneous soluble acidifier. Therefore these two routes represent a perfect comparison of the invention and the priori art:

Description of the Example According to the Invention:
An organic PC-solution (15 weight %), stirred in a container
1. was mixed with a solution of HCl-gas in chloro benzene
2. afterwards 3×washed with water and
3. concentrated, and the PC isolated on a devotalization extruder (evaporating extruder),
4. the molten PC cords were cooled in water and granulated
5. out of these granules we made colour sample sheets (color chips), which
6. were aged using sterilization conditions and the comparative example:
using another sample of the same PC-solution in the same procedure as above, except the acidification step 2.
All procedures and expressions underlined are explained in the following list.

| | |
|---|---|
| "PC solution" | 20 l of a 15% polycarbonate solution based on polycarbonate of bisphenol A in a 1:1 mixture of methylene chloride and chlorobenzene |
| "HCl" | 2 l of chlorobenzene in which approx. 10 g of HCl gas had been dissolved |
| "Water" | Deionized water |
| "Wash" | Washing of the PC solution three times using 20 l of deionized water each time in a glass vessel having a propeller stirrer |
| "Evaporating extruder" | Extrusion of the PC melt via an evaporating extruder (devotalization extruder) |
| "Granules" | Spinning of the molten thread through a water bath containing deionized water, and granulation into granules of 15–35 mg |
| "Color sample sheets" | Production of a polycarbonate article 4 mm thick by injection molding (color chips) |
| "Sterilization" | sterilization of the color sample articles with water vapour, 18 hours at 126° C. and 1.4 bar superheated steam. |

A count was then made of the white points that had formed on the specimens, which occur by decomposition of polycarbonate by alkaline seed spots.

| According to the invention ( . . . ): | | Comparative test ( . . . ): |
|---|---|---|
| 3 | defects > 0.2 mm | 9 |
| 5 | defects 0.05–0.2 mm | 18 |

The success of the process according to the invention is astonishing and demonstrates the surprising superiority of the process according to the invention over the prior art. The process may be improved further by further optimising the techniques used for mixing the HCl solution, or by the use of HCl gas.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A work-up process comprising:
  (a) providing an organic phase comprising polymer, organic solvent and alkaline impurities;
  (b) acidifying homogeneously the organic phase by adding to the organic phase an acid compound that is homogeneously soluble in the organic phase, thereby forming a homogeneously acidified organic phase;

(c) optionally washing the acidified organic phase with water; and (d) optionally isolating the polymer from the washed organic phase.

2. A molded article comprising the isolated polymer prepared by the process of claim 1 wherein after exposing said molded article to 18 hours' sterilisation at 126° C. and a superheated steam pressure of 1.4 bar, said molded article exhibits fewer than 10 defects in the form of white spots over an area of 11.5×16 mm.

3. A method of using the isolated polymer prepared by the process of claim 1 comprising producing at least one of molded specimens and extrudates.

4. Molded specimens and extrudates comprising the isolated polymer prepared by the process of claim 1.

5. The process of claim 1 further comprising:

performing an interfacial condensation process, which results in the formation of said organic phase and an aqueous phase; and isolating said organic phase from said aqueous phase, thereby providing said organic phase.

6. The process of claim 1 wherein said acid compound is selected from at least one of: $C_1$–$C_{22}$ carboxylic acids, optionally branched or substituted with —O-alkyl, O-aryl, —CO—, —F, —Cl, —Br or heterocycles; $C_1$–$C_{22}$ sulfonic acids, optionally branched or substituted with —O-alkyl, O-aryl, —CO—, —F, —Cl, —Br or heterocycles; $C_1$–$C_{22}$ dicarboxylic acids; $C_1$–$C_{22}$ disulfonic acids; mineral acids; and an acid derivative selected from at least one of $SO_2$, $P_2O_5$, $P_2O_3$, $SOCl_2$, $SO_2Cl_2$, $POCl_3$, anhydrides of organic acids, and anhydrides of mixed organic acids.

7. The process of claim 6 wherein said mineral acid is selected from at least one of HCl, HBr, $H_2SO_4$, $H_2SO_3$, $H_3PO_4$, $H_3PO_3$, metaphosphoric acid and polyphosphoric acid; and said acid derivative is selected from $SO_2$.

8. The process of claim 7 wherein said acid compound is selected from at least one of HCl, $SO_2$ and $H_3PO_3$.

9. The process of claim 1 wherein said acid compound is added in the form of a gas.

10. The process of claim 9 wherein said acid compound is a gaseous acid selected from gaseous HCl, gaseous HBr and gaseous $SO_2$.

11. The process of claim 1 wherein the polymer is a polycarbonate.

\* \* \* \* \*